No. 655,507. Patented Aug. 7, 1900.
J. F. McGUIRE.
HOSE.
(Application filed May 17, 1900.)
(No Model.)
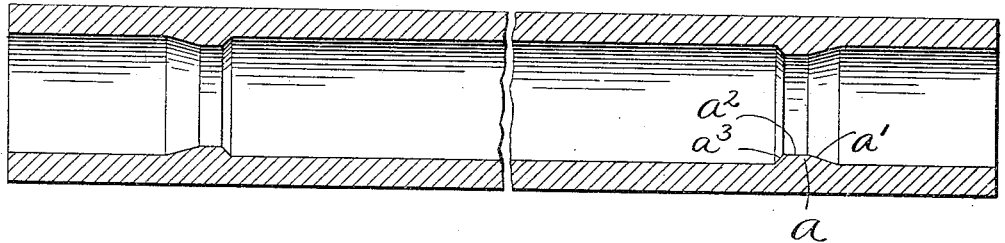
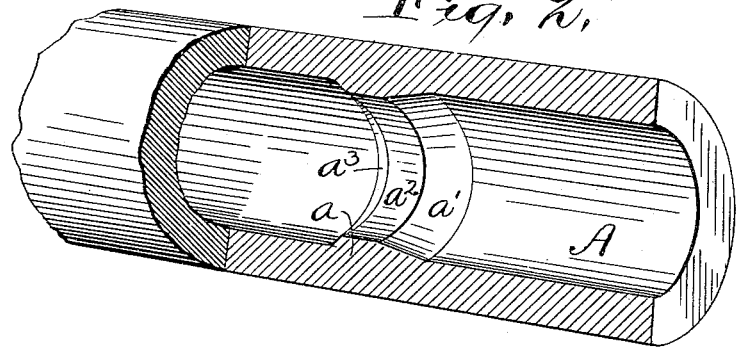
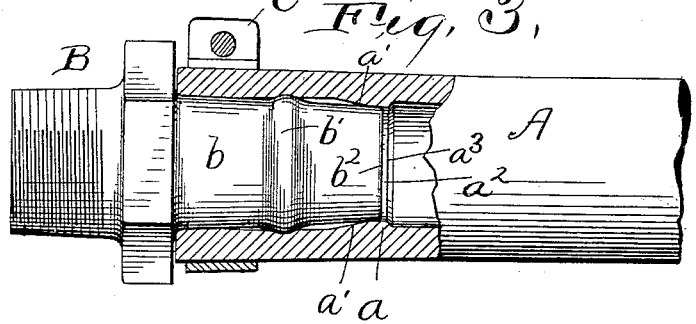
Witnesses,
E. B. Gilchrist
F. D. Ammen
Inventor,
John F. McGuire
By his Attorneys,
Thurston & Bates

UNITED STATES PATENT OFFICE.

JOHN F. McGUIRE, OF AKRON, OHIO, ASSIGNOR TO THE B. F. GOODRICH COMPANY, OF SAME PLACE.

HOSE.

SPECIFICATION forming part of Letters Patent No. 655,507, dated August 7, 1900.

Application filed May 17, 1900. Serial No. 17,011. (No model.)

*To all whom it may concern:*

Be it known that I, JOHN F. MCGUIRE, a citizen of the United States, residing at Akron, in the county of Summit and State of Ohio, have invented a certain new and useful Improvement in Hose, of which the following is a full, clear, and exact description, reference being had to the accompanying drawings.

This invention relates particularly to hose used to couple pipes of an air-brake system between car-platforms. Such hose when not coupled hangs with the interior exposed to the outside air, whereby sand and dirt work into the hose and get between the end of the nipple and the rubber, and as the hose expands under pressure this grit becomes worked into the rubber, abrading it at the edge of the nipple.

In the ordinary air-brake system there is a cock adjacent to the nipple to which the hose is attached. Frequently the handle of this cock sticks and the brakeman to loosen it customarily strikes it with a coupling-pin or other heavy piece of metal and not infrequently his blow glances, landing on the air-hose near the edge of the nipple, thereby injuring the hose at this point. As soon as the inner rubber and duck become worn through the hose is rendered practically worthless for the high air-pressure which it must sustain. So serious are these destructive agencies that I estimate eighty-five per cent. of the air-hose used in the ordinary train-brakes wear out at the edge of the nipple and become worthless before they are worn out elsewhere; but while these facts are well known no satisfactory remedy has, so far as I know, been heretofore proposed. To relieve the hose by putting a padding of soft rubber on the outside of the nipple and covering the inner end of it has been tried. Inasmuch, however, as the exterior surface of the nipple must be considerably larger than the normal interior surface of the hose, in order to make an absolutely-tight fit for the severe pressure to which the hose is put so much friction is encountered in inserting the nipple with the yielding packing that the latter is very frequently torn loose from the nipple and either becomes bunched on an intermediate portion of the nipple or works entirely free into the hose-pipe, in each event leaving the edge of the nipple free and actually holding it away from the wall of the hose, so that the dirt can work in more easily than if the soft packing had not been there, and when the soft packing tears entirely loose having the additional disadvantage that the latter sometimes is carried through the hose into the triple valve of the air-brake, interfering with its operation. Moreover, if the soft packing carried by the nipple could be made of sufficient strength to insure its not being torn apart in inserting the nipple it would be of such size as to bend the hose outward considerably at the edge of the nipple, and the hose, being quite stiff from the necessary thickness, will approach this increased diameter somewhat gradually, leaving an easy opportunity for the grit and sand to work in between the hose and the packing, and the sand so working in will soon become embedded in the soft packing and will be caused thereby to work into the hose and rapidly abrade it.

In order to hold the soft packing on the nipple, it has been proposed to put a rigid metallic ring inside the nipple, binding the packing thereto and letting the packing extend over the edge of the nipple; but this has the additional disadvantage that the inside ring reduces the effective size of the train-pipe, and this in a long train of freight-cars, for example, amounts to a very material impedance to the air-discharge, reducing the efficiency of the air-brake system.

In addition to all the disadvantages above set out of nipples which carry soft packing is that of securing the packing to the nipple. The nipples become rusted in use, and thus have considerable variation in size, it being the custom to use the nipples again and again as new hose replaces that which is worn out. Moreover, some provision must be made for renewing the packing and for securing it to nipples which thus become of various sizes, which is a comparatively difficult and expensive matter and can only be conveniently performed at a suitable machine-shop.

I have devised a very simple means for protecting the hose from the abrasion and wear above referred to. This consists in securing to the bore of the hose at a distance from the end of the hose equal to the projecting portion of the nipple an annular boss or fillet, on which the edge of the nipple lies when inserted, the fillet bearing snugly against the edge of the nipple and preventing the access of sand or grit between the nipple and hose and also protecting the hose in case of an exterior blow.

My invention thus consists, broadly, of a hose having such fillet and also of the specific form in which I have found it preferable to make the fillet, as hereinafter shown and described.

In the drawings, Figure 1 is a central longitudinal section through my air-hose, part of the hose being broken away at the center. Fig. 2 is a perspective section through such hose near one end; and Fig. 3 is a side elevation, partly in central section, through the hose near the end, showing the nipple in place.

Referring to the parts by letters, A represents the hose, B the nipple, and C the strap, which may encircle the hose to bind it to the nipple. The nipple may have the usual projecting sleeve $b$ with the bead $b'$ around it.

The fillet is designated $a$. It is formed at such distance from the end of the hose that the end $b^2$ of the sleeve $b$ rests on it when the nipple is in place, as clearly shown in Fig. 3. This fillet on the side toward the end of the hose inclines gradually, as at $a'$, so that the nipple will ride up on it in being inserted. Beyond this gradual incline $a'$ is a cylindrical part $a^2$ of sufficient length so that the end of the nipple will rest upon it throughout the variation of the nipple, (owing to the irregularity in casting them or subsequent rust,) and beyond the circular part $a^2$ the fillet returns somewhat abruptly, as at $a^3$, to the wall of the hose. The edge $a^3$ inclines enough so that there is no tendency for dirt or grit to stick there, but is made as abrupt as is thus efficient to save material. Corresponding fillets $a$ are placed near each end of the hose-pipe, as indicated in Fig. 1. The fillets are secured to the bore of the hose, as stated, preferably by being made integral therewith. This is accomplished by having an annular groove in the mandrel on which the hose is made and forcing the rubber down into this groove and backing up the depression thus made with other gum. This makes a continuous smooth skin on the inside of the pipe. This means for protecting the hose allows the ordinary nipple to be used without any accurate or expensive work being done on it to make it carry a yielding packing. Old nipples can be used as well as new ones, and the effective bore of the nipple is in no way reduced. Moreover, the form of the fillet which allows no edge in which the dirt could collect could not be provided for a packing carried by the nipple, for in the latter event the packing would be rolled up onto the outer side of the nipple when the latter was inserted.

It is apparent that in the matter of cheapness my protecting means has a decided advantage in that the rubber packing is carried by other rubber, which is a very simple operation and is done when the hose is made. It enables the purchaser to obtain the hose and protection complete, ready for use, from the rubber manufacturer and the nipple from the iron manufacturer without the additional expense of rubbering the nipple.

Having described my invention, I claim—

1. A rubber hose having within it an annular fillet or boss of yielding material secured to the bore of the hose, substantially as described.

2. A rubber hose having within it an annular fillet or boss made integrally with the hose whereby a continuous skin of rubber is formed on the inside of the hose and over the boss, substantially as described.

3. A cylindrical hose having within it comparatively near its end an annular fillet inclined toward the end of the hose, said fillet being of yielding material and being carried by the hose, substantially as described.

4. A rubber hose having within it comparatively near its end an annular fillet which fillet has a cylindrical face $a^2$ and a gradually-inclined face $a'$ leading therefrom to the bore of the hose toward the outer end of the latter, substantially as described.

In testimony whereof I hereunto affix my signature in the presence of two witnesses.

JOHN F. McGUIRE.

Witnesses:
P. W. LEAVITT,
W. F. READING.